(12) United States Patent
Koschig et al.

(10) Patent No.: US 6,223,515 B1
(45) Date of Patent: May 1, 2001

(54) LINK CHAIN

(75) Inventors: Richard Koschig, Freising; Peter Graemann, Sainbach; Peter Schulze, Neufahrn, all of (DE)

(73) Assignee: Joh. Winklhofer & Sohne GmbH & Co. KG, Munich (DE)

( * ) Notice: Subject to any disclaimer, the term of this patent is extended or adjusted under 35 U.S.C. 154(b) by 0 days.

(21) Appl. No.: 09/423,872

(22) PCT Filed: Mar. 16, 1998

(86) PCT No.: PCT/EP98/01520

§ 371 Date: Feb. 14, 2000

§ 102(e) Date: Feb. 14, 2000

(87) PCT Pub. No.: WO99/47438

PCT Pub. Date: Sep. 23, 1999

(51) Int. Cl.$^7$ .................................................. F16G 13/06
(52) U.S. Cl. ...................... 59/4; 59/5; 474/209; 474/231
(58) Field of Search .................... 59/4, 5, 78; 474/209, 474/231

(56) References Cited

U.S. PATENT DOCUMENTS

| | | | |
|---|---|---|---|
| 2,816,453 | * 12/1957 | Frank et al. | ................................ 59/4 |
| 3,135,128 | 6/1964 | Rudolph . | |
| 5,468,376 | * 11/1995 | Bates | ........................................... 59/4 |
| 5,943,855 | * 8/1999 | Morimoto et al. | ........................ 59/5 |

FOREIGN PATENT DOCUMENTS

| | | | |
|---|---|---|---|
| 40302 | * 7/1965 | (DE) | ............................................ 59/5 |
| 119898 | * 9/1984 | (EP) | ............................................ 59/5 |
| 0 214 948 | 3/1987 | (EP) . | |
| 0 644 133 | 3/1995 | (EP) . | |
| 0 764 599 | 3/1997 | (EP) . | |
| 63-125842 | * 5/1988 | (JP) | ............................................ 59/5 |
| 1-238734 | * 9/1989 | (JP) | ............................................ 59/4 |

* cited by examiner

Primary Examiner—David Jones
(74) Attorney, Agent, or Firm—Finnegan, Henderson, Farabow, Garrett & Dunner, L.L.P.

(57) ABSTRACT

A link chain having chain links interconnected at respective hinge points by a hinge bolt, at least one bearing bushing arranged on a hinge bolt, at least one roller arranged on said bearing bushing such that it is rotatable about the hinge bolt, and an axial retaining device attached to the hinge bolt and used for axially securing the bearing bushing and the roller. For reducing vibrations in the link chain, a bearing bushing is provided having an axial damping area on at least one end face area thereof, the damping area being formed integrally with the bearing bushing, and the bearing bushing being arranged such that the damping area rests against the axial retaining device.

20 Claims, 3 Drawing Sheets

LINK CHAIN

BACKGROUND OF THE INVENTION

The present invention relates to a link chain comprising chain links interconnected at respective hinge points by a hinge bolt, at least one bearing bushing arranged on a hinge bolt, at least one roller arranged on said bearing bushing such that it is rotatable about the hinge bolt, and an axial retaining means attached to the hinge bolt and used for axially securing the bearing bushing and the roller.

Such link chains provided with rollers are used as conveyor chains in most cases. In the case of known conveyor chains, the hinge bolt is extended on one side thereof for this purpose, and the hinge bolt itself or the hinge bolt with additional components attached thereto is used for transporting a great variety of objects. Especially if the objects transported have very little weight, it is extremely important to guarantee that the chain runs as smoothly as possible so that the objects can be transported without any transport accidents. Up to now, bearing bushings consisting of plastic material have been press-fitted into the rollers which were then arranged on the hinge bolts in a freely rotatable manner. For certain cases of use, the rollers were guided in rails so that the chain could be guided precisely. In most cases, the bearing bushings with the rollers press-fitted thereon were axially fixed via retaining washers which were press-fitted on said bearing bushings and which provided only such an amount of axial play that the roller was freely rotatable. Although, due to the use of a bearing bushing of plastic material, this kind of structural design proved to be a useful solution for many cases of use, transport accidents still occur especially when objects having very little weight are being transported, said transport accidents being especially due to undesired vibrations.

It is therefore the object of the present invention to provide a link chain of the type cited at the start, which operates freer from vibrations.

SUMMARY OF THE INVENTION

According to the present invention, this object is achieved by the features that the bearing bushing is implemented as an axial damping element which has, on at least one end face area thereof, a damping area formed integrally with the bearing bushing, and that the bearing bushing is arranged in such a way that the damping area rests on the axial retaining means. It goes without saying that the friction between the damping area and the axial retaining means should be small enough to guarantee that the roller continues to roll. On the basis of the structural design of the bearing bushing, the roller is arranged such that it is damped especially in the axial direction. Due to the fact that the bearing bushing and the damping area are formed integrally with one another, relative movements between these two components will be prevented, whereby an additional friction surface is avoided and wear between these components is prevented. The additional axial damping has the effect that also tilting movements about the hinge bolt axis will be damped. This is important especially in cases where the chain in question is a side bow chain which is also capable of carrying out a curve movement transversely to the hinge bolt. Such vibration damping by the bearing bushing can be relevant to a great variety of cases of use and is not limited to conveyor chains alone.

According to a preferred embodiment, the roller can be fixedly connected the bearing bushing. It proved to be advantageous when no relative movement takes place between the roller and the bearing bushing and when the bearing bushing is arranged on the hinge bolt such that it is freely rotatable thereon.

Although the components can also be joined by means of an adhesive, the roller is press-fitted onto the bearing bushing according to a preferred variant. This will avoid additional connection elements and reduce the costs.

A simple embodiment of the damping area consists of a damping area implemented as an elastic, annular support lip on the end face. Such a support lip has a comparatively small area of contact with the axial retaining means so that the friction caused is very small. In addition, a support lip can easily be constructed such that a suitable spring constant and spring force, respectively, is provided for obtaining the damping which is necessary and desired. Support lips can especially be implemented such that they permit a soft spring compression movement at the beginning and that the spring constant increases as the spring compression movement continues until, when the support lip is in full contact with the axial retaining means, the spring constant of the material will still be effective.

Preferably, the support lip can be subdivided into a plurality of ring segments which are separated from one another by respective groove areas. Due to the fact that the radial forces acting on an annular support lip during the spring compression movement are comparatively large, the best method of dealing with these radial forces is a measure of this kind, since the ring segments can expand into the groove area. This makes the support lip much more resistant to destruction by continuous loads.

For achieving an advantageous spring compression movement and for supporting the ring segments on the end face in the case of a full spring compression movement, the support lip can have a frusto-conical outer surface and a frusto-conical inner surface, the diameter of the support lip enlarging in a direction away from the end face. This also has the effect that the distance to the hinge bolt axis is enlarged so that, under the influence of tilting forces, a support on the axial retaining means is achieved by means of a much smaller spring force.

The groove areas can have a depth corresponding at least to the height of the support lip so that the relief provided by said groove areas will be effective over the whole height of the support lip.

In order to prevent a formation of cracks in the groove area, the groove areas are preferably each implemented such that they have a V-shaped cross-section and a rounded groove base.

In addition, a respective central axis of said groove areas can extend radially to the axis of the bearing bushing. This means that all groove areas are orientated radially towards the centre of the bearing bushing. This orientation is provided mainly for reasons of symmetry and for obtaining an axial load on all the ring segments which is as uniform as possible.

In order to achieve a desired spring hardness of the bearing bushing, at least the support lip is produced from an elastic material. For this purpose, a bearing bushing with a support lip is preferably produced from a plastic material, said plastic material being preferably a polyurethane. Polyurethane has sufficient strength and elasticity in combination with the smallest possible coefficient of friction. In addition, the bearing bushing will be much easier to produce when plastic material is used.

The inner and outer surfaces can be produced with a taper angle in the range from 100 to 130° C. This will have the effect that the support lip will expand comparatively widely and that the spring force will increase rapidly.

In order to augment the increase in spring force still further, the outer surface can have a smaller taper angle than the inner surface so that the thickness of the support lip continuously decreases as the distance from the end face increases. This will also have the effect that the comparatively high bending forces of the ring segments in the area of the end face of the bearing bushing are taken up more effectively.

According to one embodiment, the bearing bushing can have a circumferentially extending flange, which is provided at the bearing-bushing end face area associated with the support lip and which is accommodated in a step of a bore of the roller in an essentially precisely fitting manner. On the one hand, this flange serves to fix the bearing bushing in position, and it can be press-fitted into said step of the bore of the roller. On the other hand, it is possible that the bearing bushing projects on the other side of the roller and provides a stop surface on this side.

For specific mounting situations, it will be advantageous when both end faces of the bearing bushing are provided with a support lip. The bearing bushing is then preferably arranged between two axial retaining means.

The axial retaining means can preferably be implemented as a retaining washer which is press-fitted onto the hinge bolt and on which the support lip rests. A suitably selected press fit permits such a retaining washer to be released and pressed on again. For this purpose, the hinge bolt is preferably hardened at the location where the retaining washer is pressed on, and, if desired, the retaining washer can be replaced.

The bearing bushing can be installed such that the support lip is slightly pretensioned so that the damping effect of the bearing bushing in the axial direction will become effective at once. The support lip wil then apply pressure to the axial retaining means similar to a radial sealing ring (circlip).

In accordance with an advantageous embodiment, the hinge bolt can be implemented as a laterally projecting transport or conveying pin. Due to the structural design of the bearing bushing, this transport or conveying pin, or objects conveyed thereon, are no longer subjected to excessive vibrations so that also elements having very little weight can be transported. It is even possible to attach an apron conveyor or a similar means to the hinge bolt and to transport articles having a comparatively low weight simply by placing them on top of this apron conveyor.

In addition, the present invention relates to a plain bearing bushing for link chains. The plain bearing bushing is characterized in that it is implemented as an axial damping element having on at least one end face area a damping area which is formed integrally with the bearing bushing.

BRIEF DESCRIPTION OF THE DRAWINGS

In the following, embodiments of the present invention will be explained in detail on the basis of a drawing, in which.

DETAILED DESCRIPTION OF THE INVENTION

Figure 1:
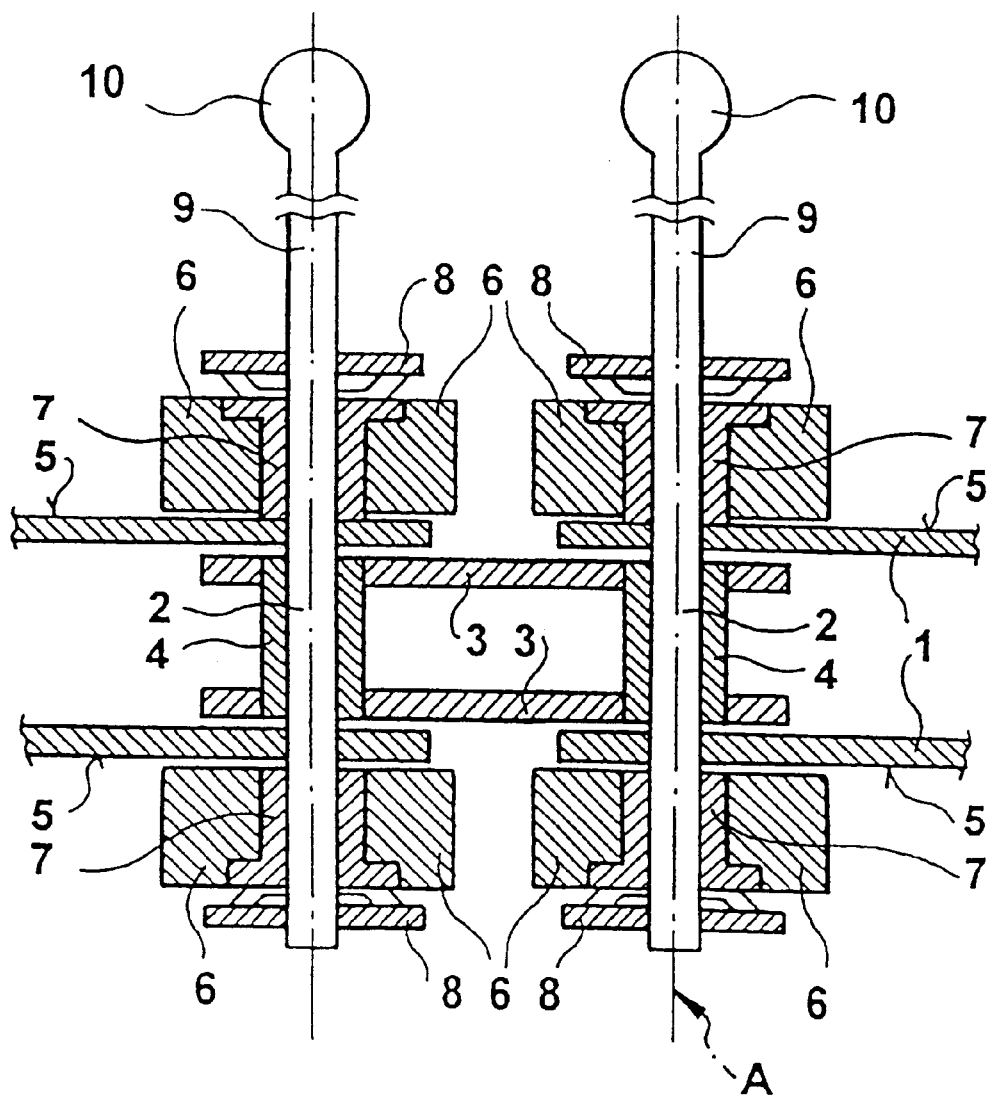
FIG. 1 shows a detail of a conveyor link chain in a schematic sectional top view.
Figure 2:
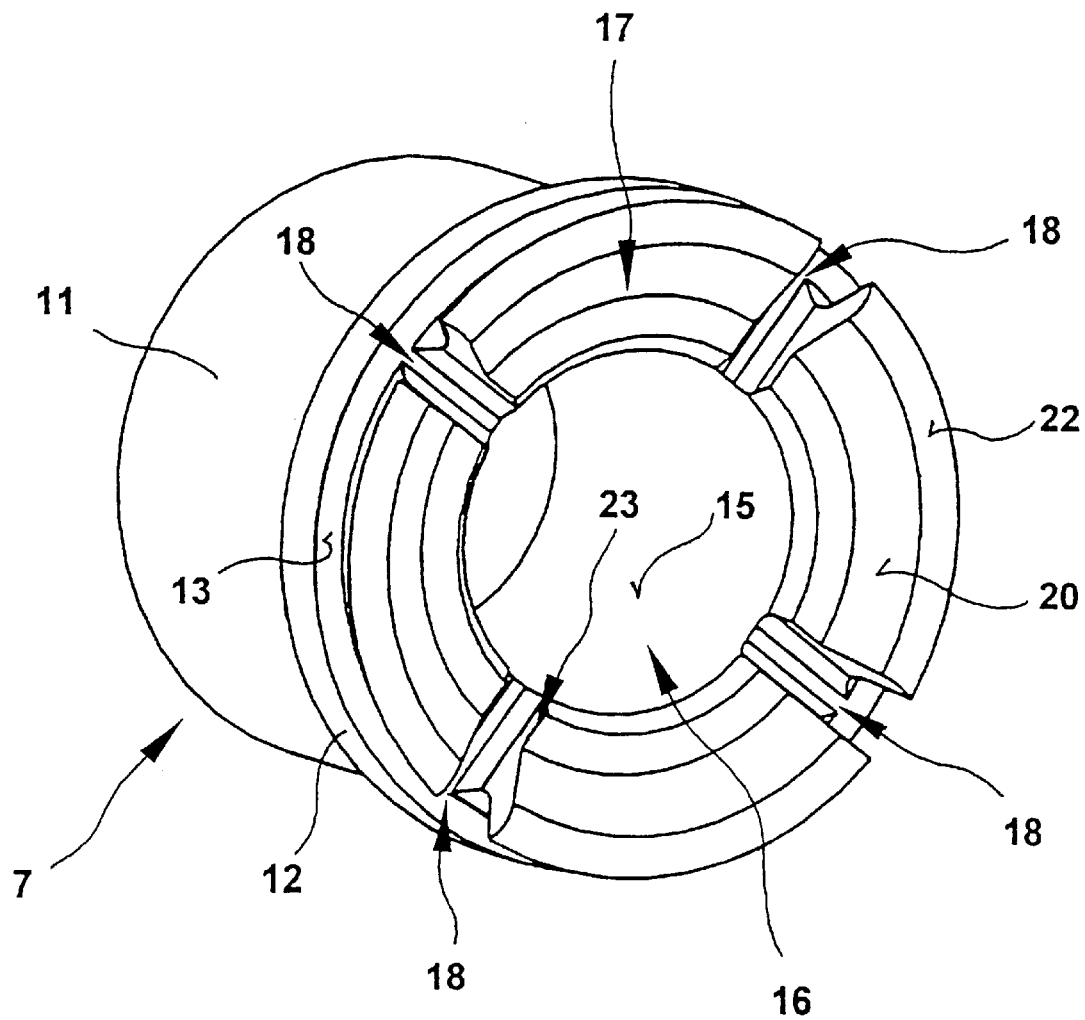
FIG. 2 shows a bearing bushing of FIG. 1 in a perspective front view.
Figure 3:
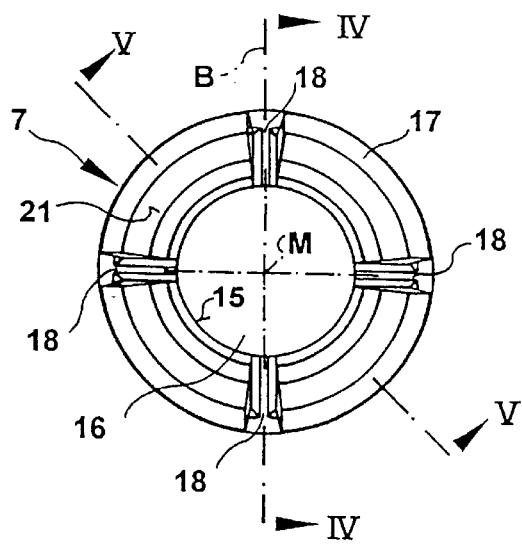
FIG. 3 shows a front view of the bearing bushing of FIG. 2 in a representation which has been reduced in size.
Figure 4:
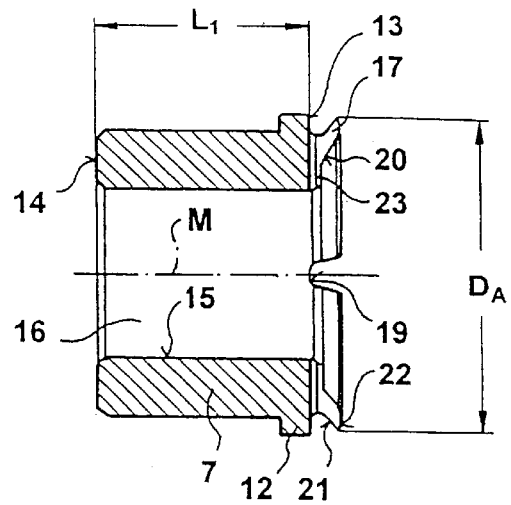
FIG. 4 shows the bearing bushing of FIG. 3 cut along the line IV—IV of FIG. 2.
Figure 5:
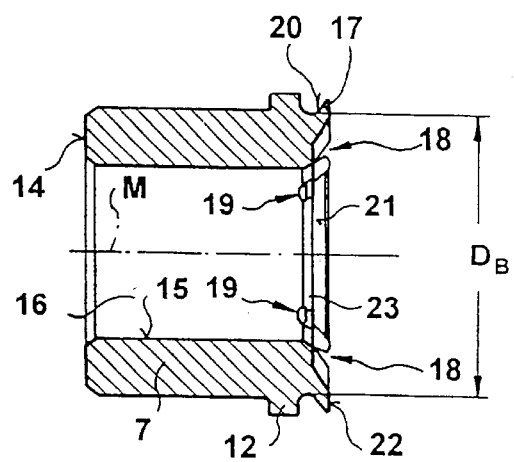
FIG. 5 shows the bearing bushing of FIG. 3 cut along the line V—V of FIG. 2.

The link chain shown in FIG. 1 comprises outer chain links, which each include two outer link plates 1 arranged in parallel and hinge bolts 2 connecting said outer link plates 1, and inner chain links connected to said outer chain links and including two inner link plates 3 arranged in parallel and hinge sleeves 4 connecting said inner link plates 3. The outer link plates 1 and the inner link plates 3 are arranged in parallel and the inner chain link is located in the space between the outer link plates 1. A respective hinge bolt 2 extends through a hinge sleeve 4 of the inner chain link so as to define a respective hinge point with a hinge axis A.

The hinge bolts 2 project laterally beyond the outer surfaces 5 of the outer link plates 1. Cylindrical rollers 6 made of plastic material are arranged on the projecting portions of the cylindrical hinge bolts 2 such that they are freely rotatable thereon. The interior bore of each of the rollers 6 is provided with a cylindrical bearing bushing 7 which is press-fitted in said interior bore or fastened therein by means of an adhesive. The rollers 6 together with the bearing bushings 7 are axially secured via retaining washers 8 pressed onto the hinge bolt 2. On the other side, such axial securing is achieved in that the bearing bushing 7 abuts on the outer surface 5 of the outer link plates 1. On one side of the chain, the hinge bolts 2 are provided with an extension 9 having a rounded head 10. The extension 9 and the head 10 serve to transport specific goods. In this respect, various structural designs are, however, possible, e.g. the provision of transport plates for producing an apron conveyor chain or the like.

When the link chain is in use, the cylindrical rollers 6 run on or in suitable rails so that the chain is guided precisely. It is also possible to provide the rollers 6 with a collar for better directional control on the rails, similar to the wheels of railway coaches. In this connection, it is common practice to let the rollers 6 move between two parallel guide surfaces.

On the basis of FIGS. 2 to 5, the structural design of the bearing bushing 7 used will now be explained in more detail. The bearing bushing 7, which is preferably produced from polyurethane, is provided with a cylindrical insertion area 11 with which the bearing bushing 7 is inserted in the interior bore of the roller 6. On one end side of the bearing bushing 7, a cylindrical flange 12 is arranged, which radially projects beyond the insertion area 11. This flange 12 defines a stop means and is accommodated in a suitably formed step of the roller 6. The flange 12 can also be press-fitted in each roller 6 as shown in FIG. 1. In addition, the bearing bushing 7 comprises a first end face 13 and a second end face 14. Both end faces 13 and 14 extend parallel to one another. The second end face 14 serves as a stop surface which is intended to abut on the outer surface 5 of the outer link plate 1. The length $L_1$ of the bearing bushing 7 from the first end face 13 to the second end face 14 is slightly greater than the width of the roller 6 so that said roller 6 will not abut on the outer surface 5 of the outer link plate 1. This means that, when the bearing bushing 7 has been press-fitted in the roller 6, the end portion with the second end face 14 projects slightly beyond the roller 6. The inner surface 15 of the bore 16 of the bushing defines the actual bearing surface of the bearing bushing 7. Hence, the inner surface 15 carries out a rotary movement relative to the outer surface of the hinge bolt 2. An appropriate amount of play with suitable exacting tolerances is provided between the bearing bushing 7 and the hinge bolt 2 for this purpose.

The first end face 13 has arranged thereon an annular support lip 17. The support lip 17 has an outer diameter $D_A$ corresponding approximately to the outer diameter of the flange 12. The cross-section of the support lip 17 could essentially be compared to the shape of a back fin of a shark. The support lip 17 is subdivided into four ring segments by four radially extending grooves 18. The rounded groove base 19 of the groove 18, which has a V-shaped cross-section, is essentially flush with the first end face 13. Due to its shape, the grooves 18 widen outwards from the groove base 19.

The support lip 17 comprises an inner surface 20 having a frusto-conical shape and an outer surface 21 having a frusto-conical shape. Both surfaces 20, 21 are inclined in the same direction, but do not extend parallel to one another. The inner surface 20 is provided with a slightly larger taper angle of approx. 121°, whereas the outer surface 21 is formed with a taper angle of approx. 110°. This has the effect that the base of the support lip 17 has a larger width than the free end of said support lip where the support surface 22 is provided, the support lip 17 resting on the retaining washer 8 via said support surface 22 in the mounted condition. The support surface 22 can be flat as well as curved or rather convex so as to reduce the friction. The outer diameter $D_A$ of the support lip 17 is therefore measured in the area of the support surface 22 and the smaller outer diameter $D_A$ in the area of the end face 13. The rounded area between the end face 13 and the support lip 17 must also be taken into account in this respect. The grooves 18 are arranged such that they are displaced by 90° relative to one another, the central axes B of said grooves 18 extending radially to the central axis M of the bearing bushing 7. Due to the frusto-conical shape of the inner surface 20 and of the outer surface 21, the diameter of the support lip 17 enlarges continuously in a direction away from the end face 13. At the bottom of the inner surface 20, there is an annular shoulder 23 projecting beyond the end face 13 and constituting an additional reinforcement of the support lip in this area, since, when the link chain is in operation, this point is subjected to a tensile load. Due to its shape and due to the material used, the support lip 17 is elastic and is capable of carrying out a suitable spring compression movement in that the cone defined by the support lip 17 expands.

In the following, the mode of operation of the above embodiment will be explained in more detail.

The distance between the retaining washers 8 and the outer surface 5 of the outer link plate 1 is chosen such that the bearing bushing 7 is arranged between these two elements with a minimum degree of pretension. The pretension should not be so large as to hinder free rotation of the rollers 6 when they are in operation. Due to the fact that the support lip 17 is formed integrally with the bearing bushing 7 as a component thereof, said bearing bushing 7 is additionally implemented as an axial damping element. This means that vibrational movements in the axial direction are damped. A link chain equipped with these bearing bushings 7 will run much more smoothly, since the plastic material of the bearing bushing 7 will damp not only vibrations in the radial direction relative to the hinge bolt 2 but also in the axial direction by means of the support lip 17. The damping is effected by a backward movement of the individual ring segments of the support lip 17 so that the support surface 22 will move towards the end face 13. In extreme cases, the support lip 17 will come into contact with the end face 13. On the basis of the desired structural design of the support lip 17, an appropriate spring constant is obtained, which will damp axial vibrations in a suitable manner.

Embodiments are also imaginable in which link chains are used, which are capable of moving along a curved path in several directions, e.g. side bow chains. In the case of such chains, also tilting movements must be damped; due to the shape of the support lip 17, this is easily possible. The grooves 18 take care that the material is not subjected to excessive stress when the cone expands.

Figure 6:
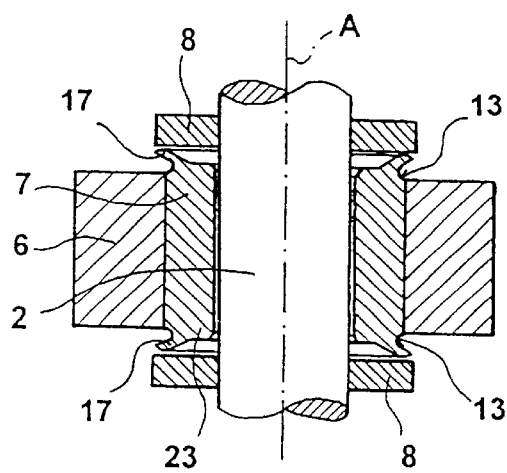
FIG. 6 shows a second embodiment of a mounting situation of a bearing bushing.

In FIG. 6, a further embodiment of the bearing bushing 7 is shown. Only essential differences will be discussed, and, consequently, identical reference numerals will be used for similar and identical components. A difference of this bearing bushing 7 is to be seen in the fact that it is not provided with a flange 12. In addition, both end faces 13 and 14 are provided with respective support lips 17 resting on respective retaining washers 8. This permits damping in both axial directions.

In addition, it should be mentioned that such a sliding-bearing bushing can also be employed for other cases of use in the case of link chains for achieving a suitable damping effect, e.g. in the area of a chain hinge.

What is claimed is:

1. A link chain comprising chain links connected at respective hinge points by a hinge bolt, at least one bearing bushing arranged on the hinge bolt, at least one roller arranged on said bearing bushing such that said roller is rotatable about the binge bolt, and an axial retaining means attached to the hinge bolt for axially securing the bearing bushing and the roller, said bearing bushing being provided with an axial damping area on at least one end face thereof, said damping area being formed integrally with the bearing bushing and said bearing bushing being arranged such that the damping area rests against the axial retaining means.

2. The link chain of claim 1, wherein the roller is fixedly connected to the bearing bushing.

3. The link chain of claim 2, wherein the roller is press-fitted onto the bearing bushing.

4. The link chain of claim 1, wherein the damping area is an elastic, annular support lip on said one end face of the bearing bushing.

5. The link chain of claim 4, wherein the support lip is subdivided into a plurality of ring segments which are separated from one another by respective grooves.

6. The link chain of claim 4, wherein the support lip has a frusto-conical outer surface and a frusto-conical inner surface, the diameter of the support lip enlarging in a direction away from said one end face of the bearing bushing.

7. The link chain of claim 5, wherein the grooves have a depth corresponding at least to a height of the support lip.

8. The link chain of claim 5, wherein the grooves have a V-shaped cross-section and a rounded groove base.

9. The link chain of claim 5, wherein a respective central axis of said grooves extends radially to an axis of the bearing bushing.

10. The link chain of claim 4, wherein the support lip consists of an elastic material.

11. The link chain of claim 4, wherein the bearing bushing and the support lip are both of a plastic material.

12. The link chain of claim 11, wherein the plastic material is a polyurethane.

13. The link chain of claim 6, wherein the inner and outer surfaces of the support lip have a taper angle in the range from 100 to 130°.

14. The link chain of claim 13, wherein the outer surface has a smaller taper angle than the inner surface so that the thickness of the support lip continuously decreases as the distance from said one end face of the bearing bushing increases.

15. The link chain of claim 4, including a circumferentially extending flange on an outer surface of the bearing bushing flange adjacent said at least one end face thereof and said support lip and a step in a bore of the roller for receiving the flange when the roller is arranged on said bearing bushing.

16. The link chain of claim 4, wherein opposite end faces of the bearing bushing are both provided with a damping area in the form of an elastic, annular support lip.

17. The link chain of claim 4, wherein the axial retaining means is a retaining washer that is press-fitted onto the hinge bolt and on which the support lip rests.

18. The link chain of claim 4, wherein when the roller is arranged on the bearing bushing and the axial retaining means is secured to the hinge bolt, the support lip is pretensioned.

19. The link chain of claim 4, wherein the hinge bolt has a laterally projecting transport or conveying pin.

20. A plain bearing bushing for link chains having an axial damping area on at least one end face thereof that is formed integrally with the bearing bushing.

* * * * *